United States Patent

Burkett

[11] Patent Number: 6,055,768
[45] Date of Patent: May 2, 2000

[54] APPARATUS FOR ELECTRICALLY CHARGING FLUIDS

[76] Inventor: Joe Everett Burkett, HCR 74, Box 75, Coleman, Tex. 76834

[21] Appl. No.: 09/144,874

[22] Filed: Sep. 1, 1998

Related U.S. Application Data

[60] Provisional application No. 60/058,909, Sep. 3, 1997.

[51] Int. Cl.[7] .............................. A01C 1/00; A01G 7/04; A01G 31/00; A01B 79/00
[52] U.S. Cl. .............................. 47/1.3; 47/58.1; 47/62 R; 47/62 N
[58] Field of Search .............................. 47/1.3, 58, 48.5, 47/59, 62 R, 62 A, 62 N, 62 C, DIG. 8, DIG. 9; 343/709, 710; 239/3, 14.1

[56] References Cited

U.S. PATENT DOCUMENTS

| | | | |
|---|---|---|---|
| D. 172,500 | 6/1954 | Gurmin | 47/1.3 |
| 1,360,654 | 11/1920 | Littlefield | 361/228 |
| 1,854,475 | 4/1932 | Littlefield | 239/3 |
| 2,301,315 | 11/1942 | Opp | 422/186.21 |
| 3,680,705 | 8/1972 | Happ et al. | 210/222 |
| 3,740,557 | 6/1973 | Kaushansky et al. | 250/106 R |
| 3,842,539 | 10/1974 | Sacalis | 47/58 |
| 4,291,125 | 9/1981 | Greatbatch | 435/240 |
| 4,680,889 | 7/1987 | Carlson | 47/58 |
| 4,915,915 | 4/1990 | Treharne | 422/186.24 |
| 5,077,934 | 1/1992 | Liboff et al. | 47/1.3 |
| 5,464,456 | 11/1995 | Kertz | 47/1.3 |
| 5,868,919 | 2/1999 | Babington et al. | 205/688 |
| 5,894,696 | 4/1999 | Ando et al. | 48/58.1 |

FOREIGN PATENT DOCUMENTS

| | | | |
|---|---|---|---|
| 2034445 | 7/1992 | Canada | 47/1.3 |
| 1825603 | 7/1993 | U.S.S.R. | 47/1.3 |
| WO 95/01090 | 1/1995 | WIPO | 47/1.3 |

*Primary Examiner*—Michael J. Carone
*Assistant Examiner*—Fredrick T. French, III
*Attorney, Agent, or Firm*—Sankey & Luck, L.L.P.

[57] ABSTRACT

The present invention relates to a method and apparatus to energize a fluid. In one embodiment, the apparatus comprises a housing defining a bore therethrough within which is disposed an antenna so as to define an annulus between the housing and the antenna, the antenna being electrically coupled to both the housing and an electrical power source so as to create an electrical field through which water or other fluids may be passed.

16 Claims, 5 Drawing Sheets

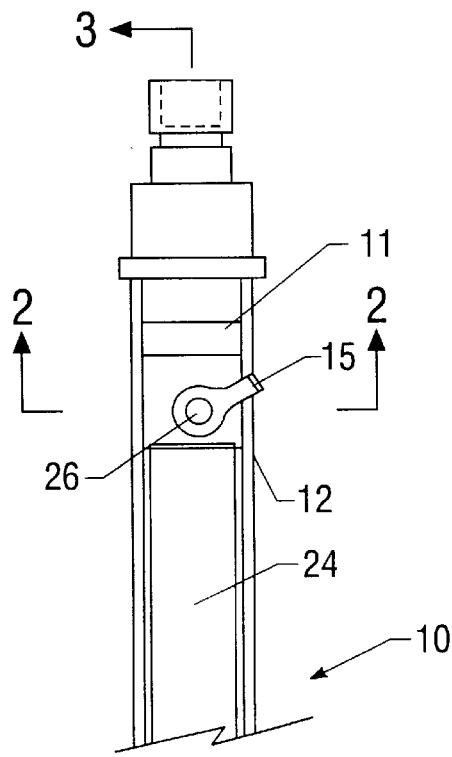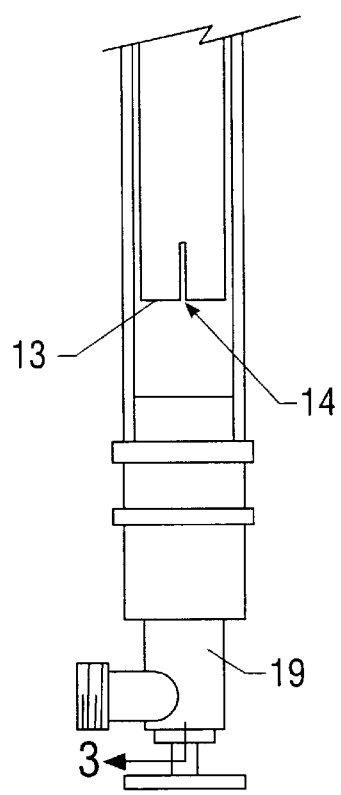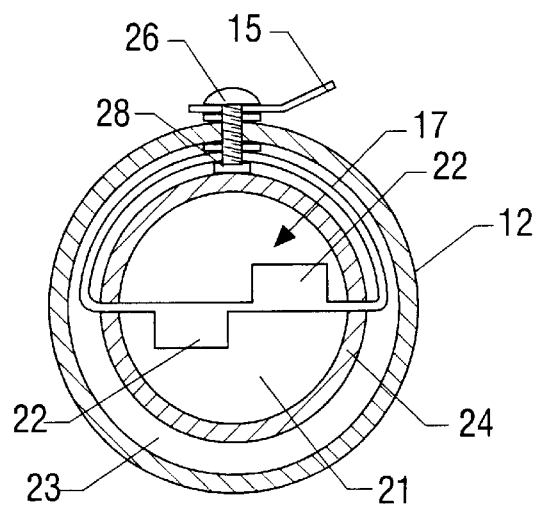
FIG. 1
FIG. 2

APPARATUS FOR ELECTRICALLY CHARGING FLUIDS

REFERENCE TO PROVISIONAL APPLICATION

Pursuant to 35 U.S.C. § 119(e), this application derives from a provisional application for the same invention filed on Sep. 3, 1997, provisional Ser. No. 60/058,909.

BACKGROUND OF THE INVENTION

1. Field of the Invention

The present invention relates to an apparatus and method to energize a fluid. More specifically, the present invention relates to an apparatus and method to introduce radiant energy to a fluid stream so as to provide a beneficial growing medium for plants.

2. Description of the Prior Art

For the past forty years, there has been a steady growth of the consumer horticultural industry in the United States and its growth continues to out pace all other major farm sectors. Overall, the industry had an estimated 44 billion dollars in 1992 sales. Potted foliage plants, cut flowers, potted flowering plants, bedding plants and cut live trees represented an estimated 6.7 billion of this figure up from 4.4 billion in 1989 at a growth rate averaging 3–5 percent per year. In this highly competitive marketplace, premiums are placed on freshness of the product.

The industry consists of thousands of growers and retailers, and in recent years, foreign imports have dramatically increased the competition in the industry. Growers and retailers are faced with ever increasing demands to produce and market quality products at reasonable prices.

The highly competitive market place has forced both grower and retailer to incorporate technological advances into their business in order to maintain competitiveness. Most of the technological developments in the industry have been production oriented and have offered few advances for the retailer. These technological advances for the most part have been limited to the commercial portion of the industry and have not been available to the consumer public.

One such advancement which has been proposed includes the treatment of the plant environment, at an atomic level, to promote health and stimulate growth. One such technique for controlling plant growth is seen in U.S. Pat. No. 5,077,934 as issued to Liboff et al, in which a magnetic filed generator produces a controlled magnetic field parallel to a predetermined axis. Another process is disclosed in U.S. Pat. No. 4,680,889 as issued to Carlson, in which a plant growth stimulator is subjected to sound waves. Still another process is disclosed in U.S. Pat. No. 5,464,456 as issued to Kertz, for the electronic stimulation of the plant environment.

Each of the aforereferenced techniques suffer from the fact that the beneficial effects realized by the plant growth medium are lost when the medium, e.g. water, moves from the magnetic, acoustic or electrical field. The ultimate result, therefore, is that these prior inventions have application only in a controlled environment.

SUMMARY OF THE INVENTION

The present invention addresses the above and other disadvantages associated with prior apparatus and methods to promote the growth of plants.

In one embodiment of the invention, an antenna assembly is disposed in a spaced relation within a fluid flow conduit so as to permit liquid flow through and around the assembly.

The assembly generally comprises a cylinder defining a hollow bore therethrough and is preferably made from a highly conductive material, e.g. gold, copper or silver. The assembly is electrically coupled to a power source through a circuit. This power source may include a battery or other electric source. When power is supplied to the antenna, radiant energy is imparted to the fluid, e.g. water, passing through the conduit.

It is contemplated that the conduit in which the antenna is situated may be formed out of an opaque, translucent or transparent material. Moreover, the interior surface of the conduit can be either reflective or nonreflective of radiant energy. The conduit may include a threaded first end and a threaded second end which permits the conduit to be inserted in a fluid line which includes complimentary threaded connections.

In an alternative embodiment, a vane assembly may be operably disposed in contact with the conduit where such assembly includes vane members located at the inlet and outlet ends of the conduit so as to modify fluid flow through and around the antenna.

To enhance the performance of the antenna, one or more booster elements may be disposed within the circuit and thus also coupled to the electrical power source. The boosters comprise a conductive transmitting wire around which is wound one or more highly conductive filaments. The resulting combination is preferably disposed within a housing doped with carbon. The fluid passing around and/or through the antenna assembly is radiantly energized and thus becomes more beneficial to plants that receive such water. As a result, when such treated water is applied to plants, plant growth is promoted. In addition, insects are removed and salts are broken down. In this respect, plants treated with such water will be healthier and have less problems due to disease.

The present invention presents a number of advantages over the prior art. One such advantage is the ability to impart a beneficial electrical charge to a moving volume of fluid such that said fluid will remain charged even when out of range of the antenna. As a result, the present invention has tremendous application to treating irrigation water conveyed to the fields in a conventional manner.

BRIEF DESCRIPTION OF THE DRAWINGS

FIG. 1 is a side view showing a first embodiment of the invention.

FIG. 2 is am enlarged cross-sectional view of the embodiment of the invention shown in FIG. 1 taken along line 2—2 of FIG. 1.

DETAILED DESCRIPTION OF THE PREFERRED EMBODIMENTS

One embodiment of the invention 10 may be given by reference to FIGS. 1–4.

Figure 9:
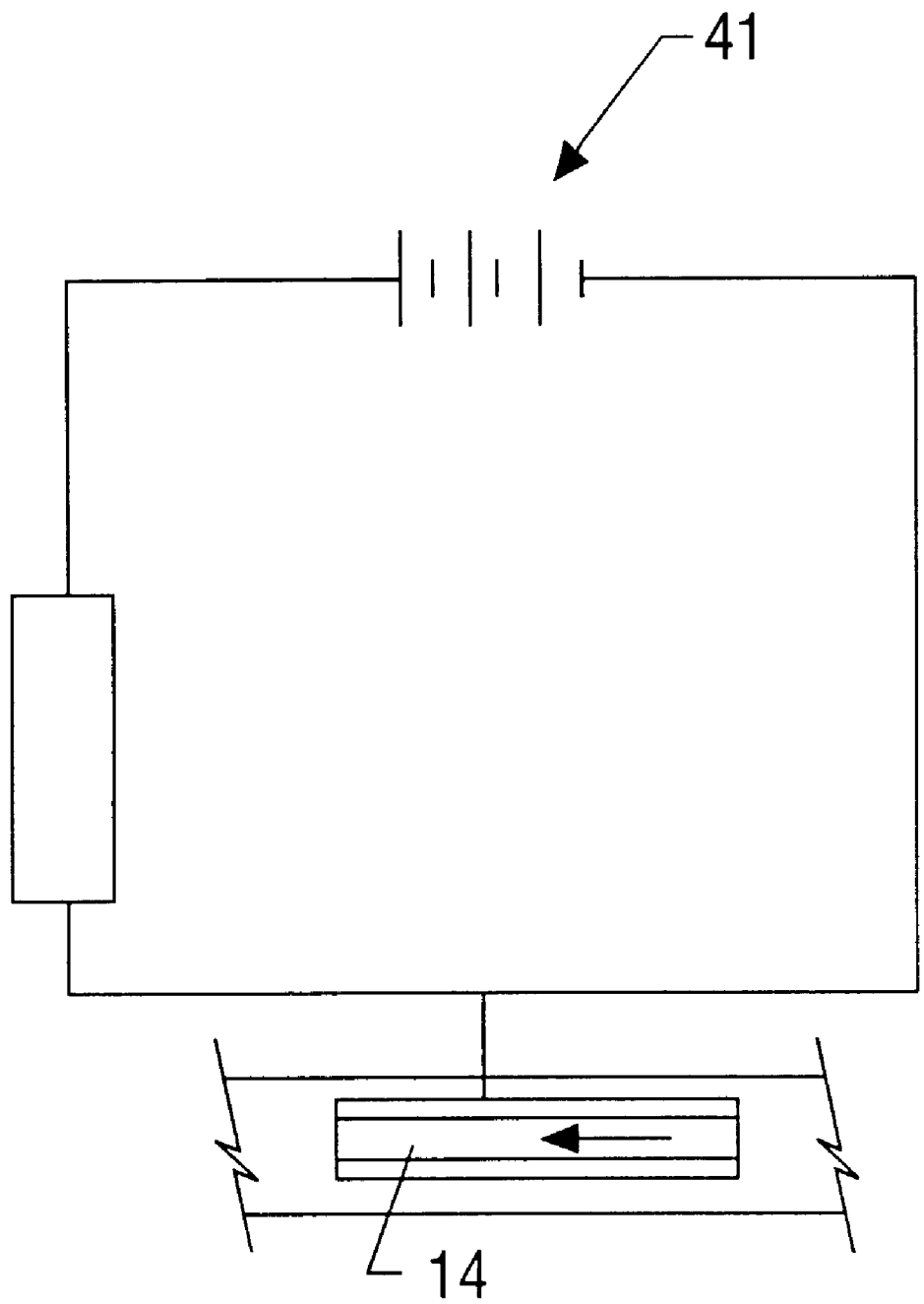
FIG. 9 is an exemplary circuit diagram of one embodiment of the invention.

By reference of the figures, an antenna 14 is disposed within a conduit 12 in a fixed and spaced relation therein to define an annulus 23 therearound and in an internal flow passageway 21. In the illustrated embodiment, the antenna-to-conduit connector includes a bolt 26 and nut 28, which bolt 26 secures an attachment tab 15 for electrical connection between antenna 14 and a source of electrical power 40, e.g. a battery. (see FIG. 9)

In a preferred embodiment, antenna 14 comprises a body or tube 24 defining a bore or passageway 21 therethrough, where said bore 21 is disposed coaxially with the longitudinal axis defined by conduit 12. Body 24 is comprised of a conductive material, e.g. gold, silver or steel, and as such readily conducts energy from power source to stimulate the electrons in the fluid passing through and around antenna 14.

Figure 3:
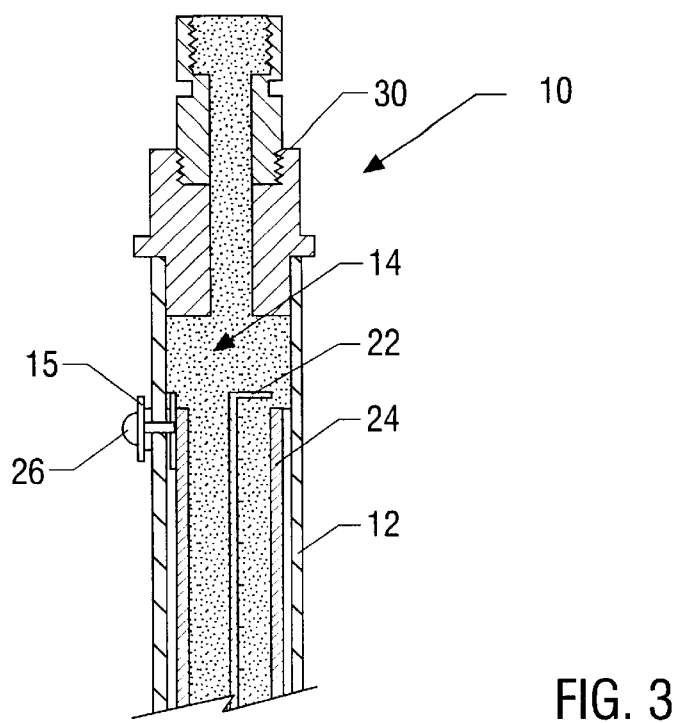
FIG. 3 is a cross-sectional view of the embodiment illustrated FIG. 1 as taken along lines 3—3.
Figure 4:
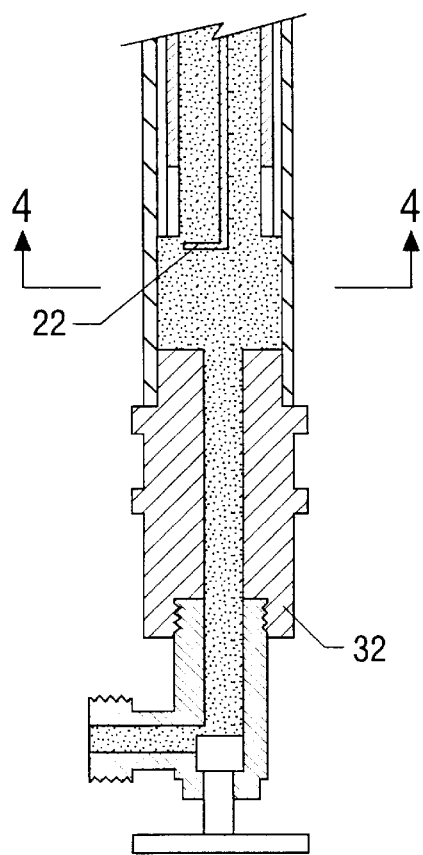
FIG. 4 is an enlarged cross-sectional view of the embodiment of the invention shown in FIG. 3 taken along 4—4 thereof.
Figure 4:
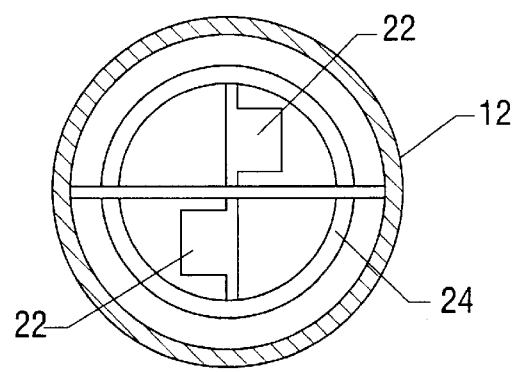

Conduit 12 may be provided with conventional first 30 and second 32 threaded ends for disposition within an existing fluid flow system 19 including complementary threaded connections (See FIG. 3). Fluid passing through conduit 12 flows around assembly 14 via annulus 23 and further flows through internal passageway 21. Conduit 12 may be manufactured from a variety of materials, inclusive of materials demonstrating varying degrees of transparency. Moreover, the interior surface of the conduit 12 can be either reflective or nonreflective of radiant energy.

In order to agitate the flow of fluids passing through internal flow passageway 21, a vane assembly 17 may be disposed within conduit 12 and coupled to body 24, where such assembly 17 includes vane members 22 located at an inlet end 13 and an outlet end 11 of the said tube 24 (See FIG. 3).

Figure 5:
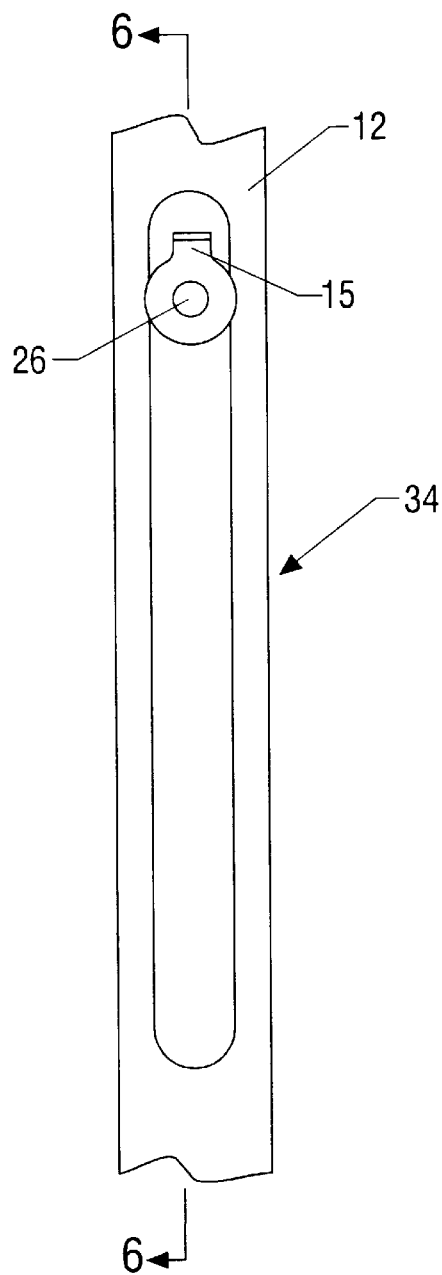
FIG. 5 is a side view of an exemplary booster of the invention as it may be disposed within a fluid conduit.
Figure 6:
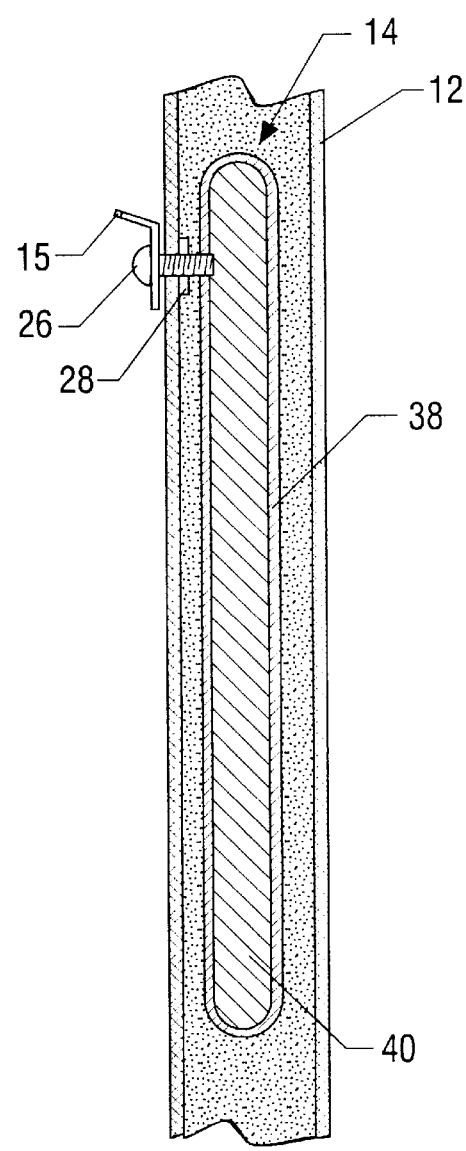
FIG. 6 is a cross-sectional view of the embodiment shown in FIG. 5 taken along line 6—6 thereof.
Figure 7:
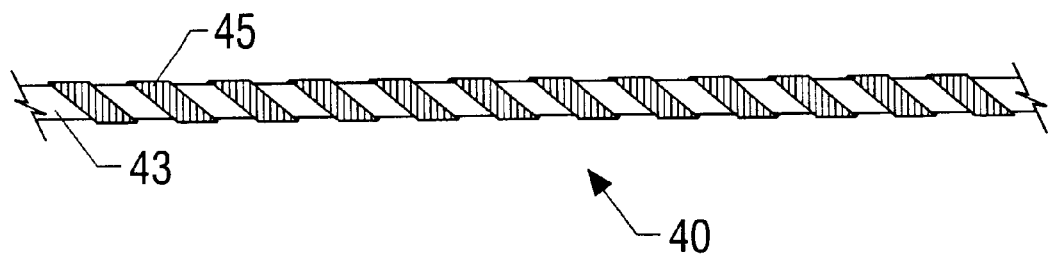
FIG. 7 is a cross sectional view of the booster of the invention.

FIGS. 5–8 disclose a booster assembly or amplifier 34 including a housing 38 and antenna elements 40 disposed within the said housing 38. Housing portion 38 does not permit liquid to contact antenna elements 40. Though FIGS. 5–6 illustrate the booster assembly 34 disposed within a fluid passageway, it is contemplated that booster assembly will also be disposed external to any fluid flow.

Antenna element 40 is made from a highly conductive wound filament 45, e.g. gold, which is wound around the main conductive wire 43. Alternatively, windings 45 may be made from silver or stainless steel or other conductive materials.

Figure 8:
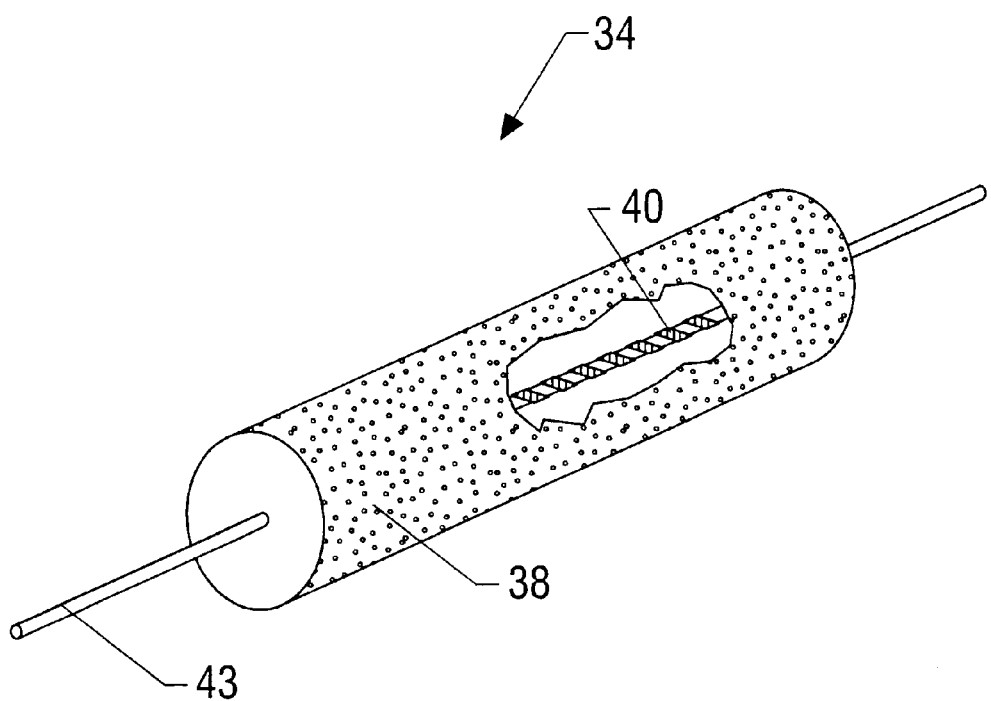
FIG. 8 is a cutaway cross sectional view of one embodiment of the booster.

Antenna element 40 is preferably disposed with a housing 38 (See FIG. 8). It is envisioned that housing 38 may be made from a fiberglass compound, a resin or other material to protect windings 45 from corrosion and contamination. In a preferred embodiment, housing 38 is carbon doped to a ratio of some 6–20% carbon. In another embodiment, carbon may be added onto the windings 45 in the form of a sheath or encasement. In still another embodiment, particles of carbon can be packed into the spaces provided between the windings 45. It is preferred to use a carbon source known as hygiene carbon.

Booster assembly 34 is electrically connected to power source 41 such that it is situated in line with antenna 14. In such a fashion, the net effect of antenna element 14 is enhanced. In a preferred embodiment, booster assembly 34 and antenna assembly 14-are operated at a range of some 1–15 volts at 5 watts.

The present invention intensifies the effects of radiant energy which is applied to the water. For example, the invention 10 increases radionic or loptic energy frequencies that are applied to water. When such treated water is applied to plants, plant growth is promoted. In addition, insects are removed and salts are broken down. In this respect, plants treated with such water will be healthier and have less problems due to disease.

EXAMPLE 1

Seeds of cucumber were obtained and divided into two equal groups. Both groups were planted in seedling trays filled with topsoil. The plant depth of both groups was between ¼–½ inches. The first group was treated with water flowing through an antenna containing liquid treatment apparatus where the antenna was supplied 6 volts direct current which was amplified by the use of two booster assemblies. The second group of seeds were treated with untreated water in the same quantity as for the seeds of th first group. The seeds of the first group germinated in 26 hours while the second group did not germinate until 48 hours.

EXAMPLE 2

Seeds of long red chile plants were obtained and divided into two equal groups. Both groups were planted in seedling trays filled with topsoil. The seeds of both groups were planted to a depth of between ¼–½ inches. The first group was treated with water flowing through an antenna containing liquid treatment apparatus where the antenna was supplied 6 volts direct current which was amplified by the use of two boosters. The second group of seeds were treated with untreated water in the same quantity as for the seeds of the first group. The seeds of the first group germinated in 12 days while the seeds in the second group did not germinate until 21–31 days later.

The foregoing detailed description is considered as illustrative only of the principles of the invention. Numerous modifications and changes will readily occur to those skilled in the art and therefore, it is not desired to limit the invention to the exact construction and operation shown and described. Accordingly, all suitable modifications and equivalents falling within the broad scope of the subject matter described above may be resorted to in carrying out the present invention.

What is claimed is:

1. An apparatus for enhancing the beneficial aspects of a conductive plant medium comprising;
   a housing defining a first bore therethrough so as to promote the flow of fluid through said housing; and
   an antenna disposed within and in such spaced relation to said bore so as to define an annulus therearound, said antenna electrically coupled to said housing and an electrical power source.

2. The apparatus of claim 1 where said medium is substantially all water.

3. The apparatus of claim 2 where said water includes a bactericide.

4. The apparatus of claim 1 further including an amplifier electrically coupled to said antenna and said power source.

5. The apparatus of claim 4 where said amplifier comprises a length of an electrical conductor around which is disposed a series of windings of an electrically conductive filament.

6. The apparatus of claim 5 further including at least a partial layer of carbon disposed about said windings.

7. The apparatus of claim 1 where said housing comprises a conduit adapted to be coupled in fluid communication with a pipeline conveying said medium.

8. The apparatus of claim 1 when said antenna comprises a conductive sleeve defining a second bore therethrough.

9. The apparatus of claim 1 where said power source includes a battery.

10. The apparatus of claim 1 further including means to modify the flow of the medium through the first bore.

11. An apparatus for disposal in a conductive plant medium comprising:
- a tubular housing disposed in fluid communication with a stream of a conductive plant medium, where said housing defines a certain inner diameter;
- a body disposed within and in spaced relation to said housing, where said body defines an outer diameter less than the inner diameter of said housing so as to form an annulus for the flow of said medium through said bore around said body;
- said body defining a bore therethrough to also provide for the flow of fluid therethrough; and
- said body formed of a conductive material and coupled to an electrical power source.

12. The apparatus of claim 11 further including means to amplify the voltage of the electrical power source prior to connection to said body.

13. The apparatus of claim 12 where said amplifier means comprises a first electrical conductor, a second electrical conductor disposed about said first conductor so as to form windings.

14. The apparatus of claim 13 wherein said windings are disposed within a protective sheath which is embedded with carbon particles.

15. The apparatus of claim 13 where carbon particles are disposed about the windings defined by the second conductor.

16. The apparatus of claim 13 where said windings are drawn from the group consisting of gold, silver, steel and copper.

* * * * *